No. 855,524. PATENTED JUNE 4, 1907.
W. R. McKEEN, Jr.
CLUTCH.
APPLICATION FILED MAY 16, 1905.

3 SHEETS—SHEET 2.

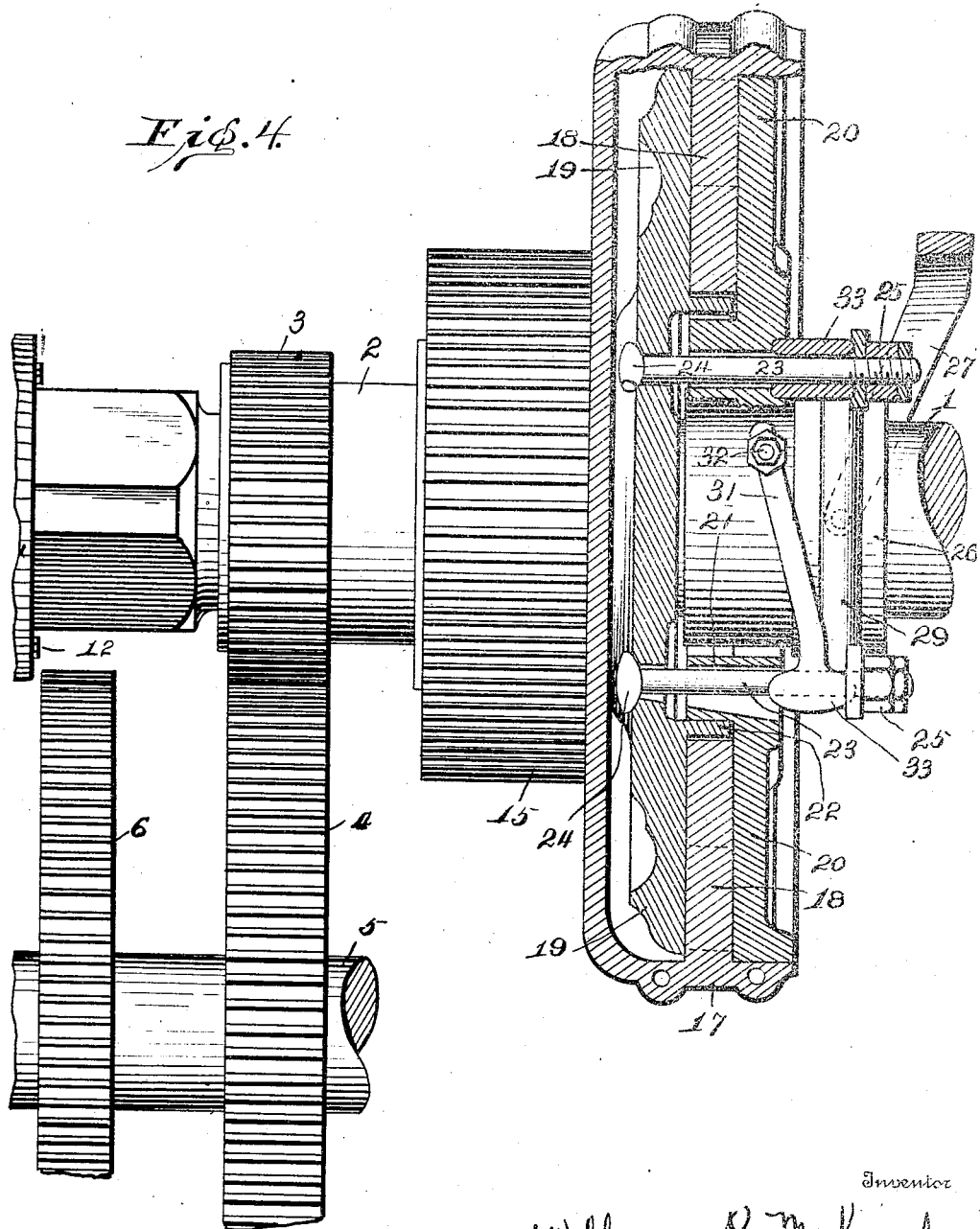

UNITED STATES PATENT OFFICE.

WILLIAM R. McKEEN, JR., OF OMAHA, NEBRASKA.

CLUTCH.

No. 855,524.  Specification of Letters Patent.  Patented June 4, 1907.

Application filed May 16, 1905. Serial No. 260,732.

*To all whom it may concern:*

Be it known that I, WILLIAM R. McKEEN, Jr., a citizen of the United States, residing at Omaha, in the county of Douglas and State of Nebraska, have invented certain new and useful Improvements in Clutches; and I do hereby declare the following to be a full, clear, and exact description of the invention, such as will enable others skilled in the art to which it appertains to make and use the same.

This invention relates to improvement in clutches, and deals more particularly with those of the friction type.

One of the objects thereof is to provide a simple and strong clutch adapted efficiently to transmit heavy power.

Another object is to provide efficient means in connection with a clutch whereby the members thereof may be thrown into contact with a maximum pressure for the power used in throwing.

Another object is to provide practical, compact and durable power transmitting means in which the amount of power transmitted may be under complete and ready control.

Other objects will be in part obvious and in part pointed out hereinafter.

The invention accordingly consists in the features of construction, combinations of elements and arrangement of parts which will be exemplified in the apparatus hereinafter described and the scope of the application of which will be indicated in the following claims.

Figure 1:
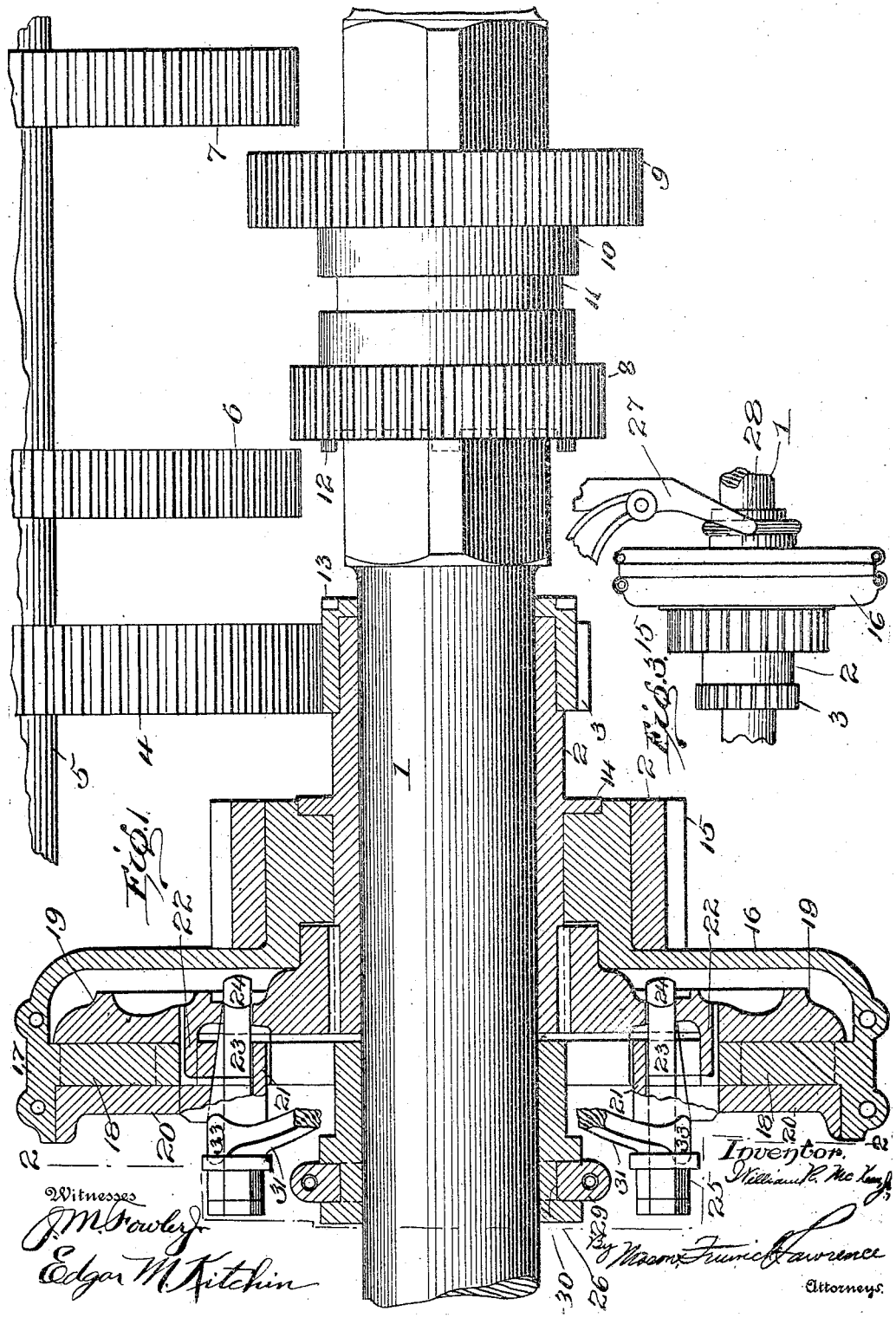
Figure 2:
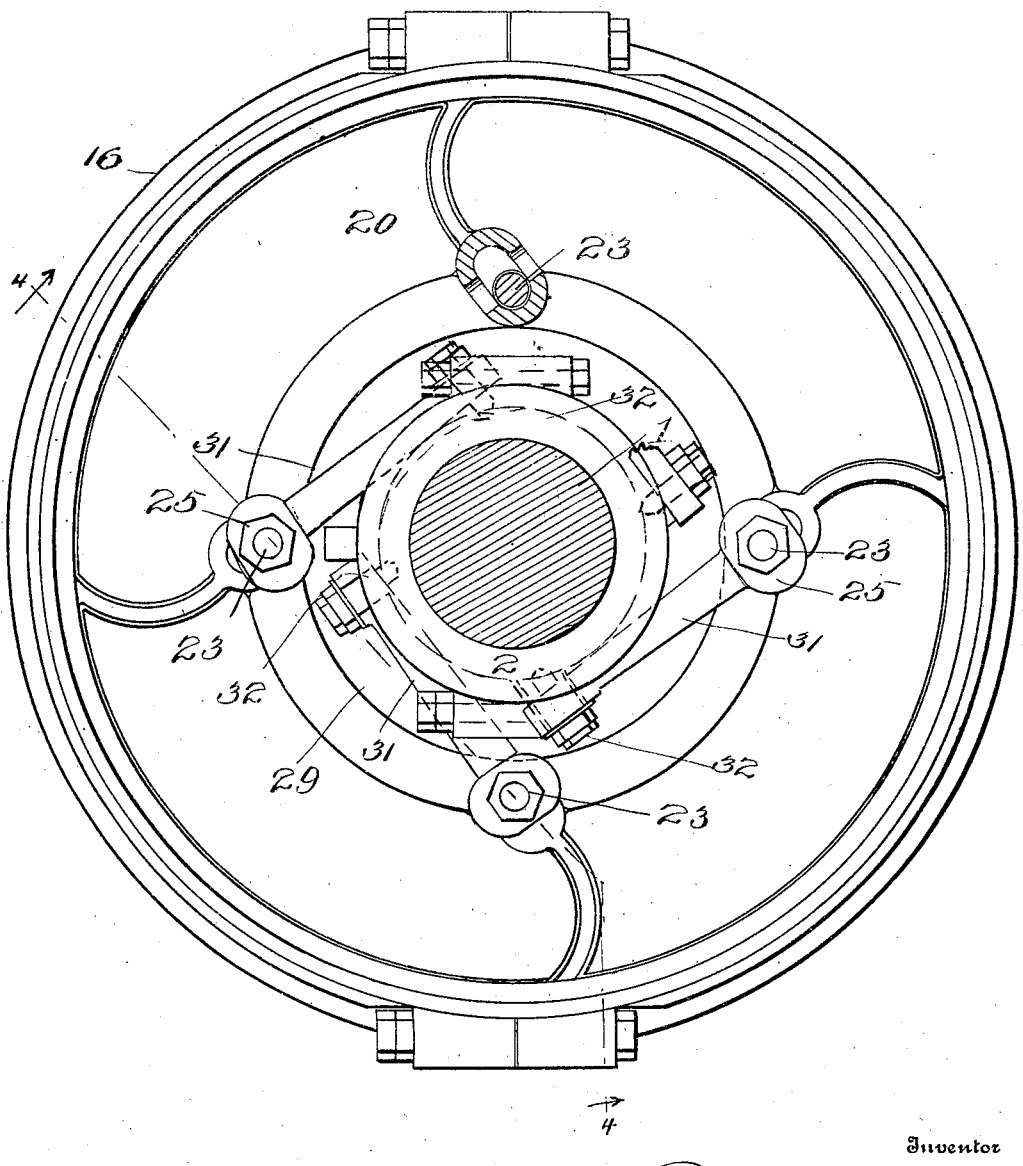

In the accompanying drawing, wherein is shown one of various possible embodiments of my invention, Figure 1 represents a longitudinal, vertical central section taken through a clutch with associated parts; Fig. 2 represents a section taken on the line 2—2 of Fig. 1, Fig. 3 is a side elevation of the clutch with associated parts. Fig. 4 is a fragmentary section taken on the planes indicated by line 4; 4 of Fig. 2 and looking in the direction indicated by the arrow.

Similar reference characters refer to similar parts throughout the several views.

In order to render clearer certain of the several features of my invention, it may here be noted that I have found that in cases wherein a considerable amount of power is to be transmitted through a friction clutch, it is usually necessary to exert a high degree of pressure upon one or more of the members thereof, and that this pressure is difficult of attainment without sacrifice of the compactness and simplicity of the structure. It may also be noted that I have found that in clutches wherein one of the members thereof is gripped upon both sides by co-acting members, there is often a tendency to relative angular displacement of the two gripping members. The above and other defects are overcome and many positive advantages attained in constructions of the nature of that hereinafter described.

Referring to the drawings by numerals, 1 indicates the driven shaft, and 2 a sleeve mounted to rotate freely thereon. In this illustrative embodiment there is shown a gear wheel 3 fixed to the sleeve 2 and meshing with the gear wheel 4 fixed to a counter-shaft 5, said counter-shaft 5 carrying gears 6 and 7 adapted to be engaged by gears 8 and 9 respectively, carried by sleeve 10 which is either formed polysided in transverse section and arranged upon a similarly polysided portion of the shaft 1, or keyed to said shaft. The sleeve 10 is provided with an annular groove 11 designed to be engaged by an actuating lever for being thrown to a position with the gear 9 in mesh with gear 7, or with the gear 8 in mesh with the gear 6, whereby power may be transmitted from the sleeve 2 to the shaft 1.

The sleeve 10 may be provided with a positive clutch member 12 adapted to be thrown into mesh with the positive clutch member 13 carried by the end of the sleeve 2, so that power may be transmitted to the shaft 1 independently of the gearing above mentioned.

Rotatably mounted upon the sleeve 2 and retained against lateral movement by the annular flange 14 carried by said sleeve, is the butt of a clutch carrier 16 on which is fixed a sprocket gear 15 designed to receive power by means of a sprocket chain or otherwise, from any suitable source.

It may here be noted that the term "carrier" is used throughout this specification and the following claims in a broad sense as denoting any part to which one of the members of a clutch is secured or upon which it is formed.

The said carrier 16 is formed with a horizontal annular, overhanging flange 17. An inwardly projecting annular flange 18 extends from the flange 17, and between the flange 18 and the main portion of the carrier 16 is arranged a disk 19, said disk being keyed to the sleeve 2 in such manner as to be free to move longitudinally thereof for a short distance and held against rotation independently thereof. The outer portion of the disk 19 constitutes one of the gripping jaws of the present improved clutch, and the gripping ring 20, arranged outside the flange 18, constitutes the other jaw. The ring 20 is provided with a plurality of inwardly extending bosses 21 which overlap an annular bead 22 formed on the disk 19. At the point of each of the bosses 21, a bolt 23 formed with a T head 24, is passed through the disk 19 and extends through the respective boss 21, and at its outer end carries a suitable nut or nuts 25. A sleeve 26 is slidingly mounted upon the shaft 1 and is designed to be moved axially toward and away from the sleeve 2 by reason of engagement of an actuating lever 27 with said sleeve, such engagement being effected through the pivotal connection of the bifurcated ends 28 of said lever with a ring 29 slidingly fitted within an annular groove 30 formed in the sleeve 26. Arranged tangentially of the sleeve 26, are levers 31—31 corresponding in number to the number of bolts 23. Each of the levers 31, is pivotally engaged by a pin 32, fixed to the sleeve 26, so that when said sleeve is moved longitudinally, all of said levers 31 will swing laterally. Each of the levers 31 extends to one of the bolt 23 and is provided with a cam head 33, interposed between the ring or gripping jaw 20 and the nut 25 of the corresponding bolt 23, the respective bolt being passed laterally through the corresponding head 33. The cam formation of each of the heads 33 is such, that, when the levers 31 are swung laterally in one direction, the said heads will act as wedges for pressing the nuts 25 outwardly and pressing the ring 20 inwardly, such movement, through the action of the bolt 23, serving to draw the disk 19 outwardly, whereby the two gripping jaws of the clutch may be caused to firmly engage the flange 18. Movement of the levers 31 laterally in the other direction will remove the wedge portion of the cam heads 33 from beneath the nuts 25 and the ring 20, and permit separation of the gripping jaws.

The levers 31, as will be obvious from Fig. 4, need to be moved only a comparatively short distance for producing the desired gripping operation or for releasing the grippers so that the said levers lie at all times substantially in the same transverse planes of the shaft 1 and substantially parallel to the flat faces of the carrier 16.

It will thus be seen that I have provided a construction of the simplest character which is well adapted to accomplish the several objects of my invention. On account of the tangential disposition of the cam levers, a greater compactness of construction and efficiency of action is attained. By reason of this arrangement not only is the clutch actuating sleeve brought closer to the clutch, thus utilizing less space in a direction longitudinal of the shaft, but the use of longer levers is rendered possible without bringing the ends thereof beyond the desired distance from the axis of rotation. In this manner, a long leverage with correspondingly great pressure is permitted, and this pressure is exerted at exactly the desired point, namely, adjacent the co-acting member upon the carrier, without necessitating the use of a carrier and gripping members of such diameter as to be cumbersome. It will also be seen that on account of the interlocking construction of the gripping members, all tendency of the same to rotate relative one to another is done away with, and this without bringing stress to bear upon the connecting bolts. The entire mechanism is of the most compact construction and yet most efficient and reliable action, and is at all times under complete control.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense.

I desire it also to be understood that the language used in the following claims is intended to cover all of the generic and specific features of the invention herein described and all statements of the scope of the invention, which, as a matter of language, might be said to fall therebetween.

What I claim is:—

1. In a clutch mechanism, the combination with a shaft, of a sleeve journaled thereon, a carrier journaled on the sleeve intermediate the length thereof and formed into a housing overhanging the end of the sleeve, an annular flange projecting inwardly from the housing, a clutch member slidingly keyed to the surrounded end of the sleeve and extending between the wall of the housing and the flange, a clutch member arranged on the outside of said flange, and means directly engaging the clutch members for producing gripping action thereof.

2. In a clutch mechanism, the combination with a shaft and a carrier rotatably sup ported by said shaft, said carrier having a flange, of clutch jaws arranged to engage the flange of said carrier, means for producing a clutching operation of said jaws, a sleeve mounted to move longitudinally of the shaft, and arms pivotally engaging the clutch actuating means and extending tangentially with respect to the sleeve and shaft, all said arms lying substantially in the same transverse vertical planes of the shaft, all of said arms being at all times substantially parallel to the flat faces of the carrier.

In testimony whereof I affix my signature in presence of two witnesses.

WILLIAM R. McKEEN, Jr.

Witnesses:
CHAS. A. COONS,
HARRY R. STRINGER.